(12) United States Patent
Thomas et al.

(10) Patent No.: US 11,299,424 B2
(45) Date of Patent: *Apr. 12, 2022

(54) POZZOLANIC COMPOSITIONS CONTAINING FLY ASH AND REMEDIATION AGENTS FOR USE IN CEMENTITIOUS MATERIALS

(71) Applicant: CR Minerals Company, LLC, Fort Worth, TX (US)

(72) Inventors: Joseph Earl Thomas, Malad City, ID (US); Richard Douglas Carter, Macon, GA (US); Jeffrey Alexander Whidden, Brentwood, MO (US)

(73) Assignee: CR Minerals Company, LLC, Fort Worth, TX (US)

( * ) Notice: Subject to any disclaimer, the term of this patent is extended or adjusted under 35 U.S.C. 154(b) by 190 days.

This patent is subject to a terminal disclaimer.

(21) Appl. No.: 16/877,387

(22) Filed: May 18, 2020

(65) Prior Publication Data

US 2020/0277227 A1 Sep. 3, 2020

Related U.S. Application Data

(63) Continuation of application No. 16/011,856, filed on Jun. 19, 2018, now Pat. No. 10,689,292, which is a continuation of application No. 15/439,572, filed on Feb. 22, 2017, now Pat. No. 10,017,418, which is a continuation of application No. 15/199,821, filed on Jun. 30, 2016, now Pat. No. 9,611,174, which is a continuation of application No. 14/748,320, filed on Jun. 24, 2015, now Pat. No. 9,561,983.

(60) Provisional application No. 62/016,965, filed on Jun. 25, 2014.

(51) Int. Cl.
| | | |
|---|---|---|
| C04B 18/08 | (2006.01) |
| C04B 28/02 | (2006.01) |
| C04B 40/00 | (2006.01) |
| C04B 14/14 | (2006.01) |
| C04B 18/14 | (2006.01) |
| C04B 111/20 | (2006.01) |
| C04B 111/21 | (2006.01) |
| C04B 111/26 | (2006.01) |

(52) U.S. Cl.
CPC ............ *C04B 18/088* (2013.01); *C04B 14/14* (2013.01); *C04B 18/08* (2013.01); *C04B 18/146* (2013.01); *C04B 28/02* (2013.01); *C04B 40/0039* (2013.01); *C04B 2111/2015* (2013.01); *C04B 2111/2023* (2013.01); *C04B 2111/21* (2013.01); *C04B 2111/26* (2013.01); *Y02W 30/91* (2015.05)

(58) Field of Classification Search
CPC ......... C04B 14/14; C04B 14/16; C04B 14/18; C04B 14/106; C04B 14/22; C04B 18/023; C04B 18/08; C04B 18/088; C04B 18/141; C04B 18/146; C04B 28/02; C04B 40/0039; C04B 2111/2015; C04B 2111/2023; C04B 2111/21; C04B 2111/26; Y02W 30/91

See application file for complete search history.

(56) References Cited

U.S. PATENT DOCUMENTS

| | | |
|---|---|---|
| 4,642,137 A | 2/1987 | Heitzmann |
| 4,842,649 A | 6/1989 | Heitzmann |
| 5,223,035 A | 6/1993 | Hopkins et al. |
| 5,261,461 A | 11/1993 | Smith et al. |
| 5,352,288 A | 10/1994 | Mallow |
| 6,277,189 B1 | 8/2001 | Chugh |
| 8,876,027 B2 | 11/2014 | Oehr |
| 9,067,824 B1 | 6/2015 | Hansen et al. |
| 9,254,490 B2 | 2/2016 | Pike, Sr. |
| 9,561,983 B2 | 2/2017 | Thomas et al. |
| 9,611,174 B2 | 4/2017 | Thomas et al. |
| 10,017,418 B2 * | 7/2018 | Thomas ............... C04B 28/021 |
| 10,370,295 B2 | 8/2019 | Thomas et al. |
| 10,377,667 B2 | 8/2019 | Thomas et al. |
| 10,457,601 B2 * | 10/2019 | Thomas ............... C09K 8/467 |

(Continued)

FOREIGN PATENT DOCUMENTS

| | | |
|---|---|---|
| CN | 102311292 | 1/2012 |
| CN | 102617067 | 1/2012 |

(Continued)

OTHER PUBLICATIONS

International Search Report for International application No. PCT/US2015/037399 dated Sep. 15, 2015.

(Continued)

*Primary Examiner* — Anthony J Green

(74) *Attorney, Agent, or Firm* — O'Connor & Company; Ryan P. O'Connor

(57) ABSTRACT

It has been unexpectedly discovered that the addition of a natural or other pozzolan to non-spec fly ash significantly improves the properties of the non-spec fly ash to the extent it can be certified under ASTM C618 and AASHTO 295, as either a Class F or Class C fly ash. The natural pozzolan may be a volcanic ejecta, such as pumice or perlite. Other pozzolans may also be used for this beneficiation process. Many pozzolans are experimentally tested and may be used to beneficiate non-spec fly ash into certifiable Class F fly ash. Additionally, this disclosure provides a method of converting a Class C fly ash to a more valuable Class F fly ash. This discovery will extend diminishing Class F fly ash supplies and turn non-spec fly ash waste streams into valuable, certified fly ash pozzolan which will protect and enhance concrete, mortars and grouts.

20 Claims, 14 Drawing Sheets

(56) References Cited

U.S. PATENT DOCUMENTS

| | | |
|---|---|---|
| 10,689,292 B2 | 6/2020 | Thomas et al. |
| 2002/0033119 A1 | 3/2002 | Styron |
| 2003/0233962 A1 | 12/2003 | Dongell |
| 2006/0201395 A1 | 9/2006 | Barger et al. |
| 2009/0105099 A1 | 4/2009 | Warrender |
| 2010/0089293 A1 | 4/2010 | Guynn et al. |
| 2010/0212551 A1 | 8/2010 | Meille et al. |
| 2011/0196069 A1 | 8/2011 | Sebastien |

FOREIGN PATENT DOCUMENTS

| | | |
|---|---|---|
| JP | 51-71306 | 6/1976 |
| JP | 2006-291085 | 10/2006 |
| KR | 2002-0067674 | 8/2002 |
| WO | WO 2003/070655 | 8/2003 |
| WO | WO 2020/042838 | 4/2010 |
| WO | WO 2013/147608 | 10/2013 |

OTHER PUBLICATIONS

Derwent-Acc-No. 2014-J38032, abstract of Chinese Patent Specification No. CN 103664026A (Mar. 2014).

Derwent-Acc-No. 2012-M88459, abstract of Chinese Patent Specification No. CN 102617067 A (Aug. 2012).

Derwent-Acc-No. 2014-D83500, abstract of Korean Patent Specification No. KR 1363893 B1 (Feb. 2014).

Sinsiri et al. "The effects of replacement fly ash with diatomite in geopolymer mortar"; Computers and Concrete, vol. 9, No. 6 (2012), pp. 427-437.

"Fly Ash Facts for Highway Engineers", American Coal Ash Association, Report No. FHWA-IF-03-019, pp. 1-74.

Phoo-ngernkham et al. "High calcium fly ash geopolymer containing diatomite as additive", Indian Journal of Engineering & Materials Science, vol. 20, Aug. 2013, pp. 310-318.

European Search Report for European patent application No. 15812436.2 dated Jan. 23, 2018.

\* cited by examiner

FIG. 1

| Cementitious Mix Design | Strength (psi) at 1 Day, 38°C | Strength (psi) at 1 Day, 21°C | Strength (psi) at 7 Days, 21°C | Strength (psi) at 28 Days, 21°C |
|---|---|---|---|---|
| 100% TI-II | 2091 | 1856 | 4205 | 7272 |
| 60% TI-II/ 40% Fly Ash Source 1 | 1203 | 544 | 2139 | 4336 |
| 60% TI-II/40% Pumice* | 1757 | 1321 | 3791 | 6597 |
| 60% TI-II/20% Pumice/ 20% Fly Ash Source 1 | 1280 | 828 | 3001 | 5937 |
| 60% TI-II/10% Pumice/ 30% Fly Ash Source 1 | 1452 | 888 | 2942 | 4928 |
| 60% TI-II/24% Pumice/ 16% Fly Ash Source 2 | 1458 | 1284 | 3594 | 5131 |
| 60% TI-II/26% Pumice/ 14% Fly Ash Source 2 | 1366 | 965 | 3555 | 5503 |
| 60% TI-II/20% Pumice/ 20% Fly Ash Source 3 | 1604 | 347 | 4290 | 7089 |
| 60% TI-II/24% Pumice/ 16% Fly Ash Source 3 | 1183 | 155 | 3256 | 5841 |
| 60% TI-II/26% Pumice/ 14% Fly Ash Source 3 | 965 | 100 | 3988 | 6564 |
| 60% TI-II/20% Pumice/ 20% Fly Ash Source 4 | 1665 | 891 | 3682 | 5673 |
| 60% TI-II/16% Pumice/ 24% Fly Ash Source 4 | 1509 | 751 | 4419 | 7006 |
| 60% TI-II/20% Pumice/ 20% Fly Ash Source 5 | 1417 | 828 | 3594 | 6417 |
| 60% TI-II/10% Pumice/ 30% Fly Ash Source 5 | 2085 | 1181 | 4287 | 6841 |

* Pumice in this table is 90% passing a 325 mesh

FIG. 2

| Cementitious Mix Design | Strength (psi) at 1 Day, 38°C | Strength (psi) at 1 Day, 21°C | Strength (psi) at 7 Days, 21°C | Strength (psi) at 28 Days, 21°C |
|---|---|---|---|---|
| 100% TI-II | 2091 | 1856 | 4205 | 7272 |
| 60% TI-II/ 40% Fly Ash Source 1 | 1203 | 544 | 2139 | 4336 |
| 60% TI-II/20% Metakaolin/ 20% Fly Ash Source 1 | 2543 | 1496 | 6331 | 8944 |
| 60% TI-II/20% Metakaolin/ 20% Fly Ash Source 1 | 1869 | 1054 | 4317 | 7425 |
| 60% TI-II/10% Metakaolin/ 30% Fly Ash Source 1 | 1980 | 1727 | 4873 | 7493 |
| 60% TI-II/8% Metakaolin/ 12% Pumice/ 20% Fly Ash Source 1 | 2206 | 1528 | 5190 | 8339 |
| 60% TI-II/24% Metakaolin/ 16% Fly Ash Source 2 | 3216 | 2018 | 8616 | 10494 |
| 60% TI-II/20% Metakaolin/ 20% Fly Ash Source 3 | 3193 | 856 | 8171 | 9965 |
| 60% TI-II/16% Metakaolin/ 24% Fly Ash Source 4 | 1604 | 949 | 6003 | 9409 |
| 60% TI-II/20% Metakaolin/ 20% Fly Ash Source 5 | 2509 | 1566 | 6187 | 9664 |
| 60% TI-II/10% Metakaolin/ 30% Fly Ash Source 5 | 2284 | 1559 | 6751 | 8096 |

FIG. 3

| Cementitious Mix Design | Strength (psi) at 1 Day, 38°C | Strength (psi) at 1 Day, 21°C | Strength (psi) at 7 Days, 21°C | Strength (psi) at 28 Days, 21°C |
|---|---|---|---|---|
| 100% TI-II | 2091 | 1856 | 4205 | 7272 |
| 60% TI-II/ 40% Fly Ash Source 1 | 1203 | 544 | 2139 | 4336 |
| 60% TI-II/20% D.E.*/ 20% Fly Ash Source 1 | 1611 | 971 | 3877 | 6070 |
| 60% TI-II/10% D.E./ 30% Fly Ash Source 1 | 1420 | 933 | 3556 | 5707 |
| 60% TI-II/24% D.E./ 16% Fly Ash Source 2 | 2202 | 1763 | 5193 | 8671 |
| 60% TI-II/20% D.E./ 20% Fly Ash Source 3 | 881 | 164 | 2343 | 5215 |
| 60% TI-II/20% D.E./ 20% Fly Ash Source 3 | 1690 | 398 | 3711 | 5521 |
| 60% TI-II/16% D.E./ 24% Fly Ash Source 4 | 1306 | 654 | 4940 | 7002 |
| 60% TI-II/20% D.E./ 20% Fly Ash Source 5 | 2018 | 1133 | 4828 | 6335 |
| 60% TI-II/10% D.E./ 30% Fly Ash Source 5 | 1734 | 1338 | 4462 | 7191 |

*D.E. = Diatomaceous Earth

FIG. 4

| Cementitious Mix Design | Strength (psi) at 1 Day, 38°C | Strength (psi) at 1 Day, 21°C | Strength (psi) at 7 Days, 21°C | Strength (psi) at 28 Days, 21°C |
|---|---|---|---|---|
| 100% TI-II | 2091 | 1856 | 4205 | 7272 |
| 60% TI-II/ 40% Fly Ash Source 1 | 1203 | 544 | 2139 | 4336 |
| 60% TI-II/20% Silica Fume/ 20% Fly Ash Source 1 | 1643 | 1150 | 4167 | 7277 |
| 60% TI-II/10% Silica Fume/ 30% Fly Ash Source 1 | 1101 | 684 | 2701 | 5333 |
| 60% TI-II/24% Silica Fume/ 16% Fly Ash Source 2 | 1901 | 1315 | 4740 | 6521 |
| 60% TI-II/20% Silica Fume/ 20% Fly Ash Source 3 | 1907 | 165 | 6102 | 7664 |
| 60% TI-II/16% Silica Fume/ 24% Fly Ash Source 4 | 1954 | 831 | 4937 | 8182 |
| 60% TI-II/20% Silica Fume/ 20% Fly Ash Source 5 | 1318 | 796 | 3763 | 6217 |
| 60% TI-II/10% Silica Fume/ 30% Fly Ash Source 5 | 1907 | 1124 | 4178 | 7139 |

FIG. 5

| Cementitious Mix Design | Strength (psi) at 1 Day, 38°C | Strength (psi) at 1 Day, 21°C | Strength (psi) at 7 Days, 21°C | Strength (psi) at 28 Days, 21°C |
|---|---|---|---|---|
| 100% TI-II | 2091 | 1856 | 4205 | 7272 |
| 60% TI-II/ 40% Fly Ash Source 1 | 1203 | 544 | 2139 | 4336 |
| 60% TI-II/20% Ignimbrite/ 20% Fly Ash Source 1 | 1894 | 1375 | 4108 | 6771 |
| 60% TI-II/10% Ignimbrite/ 30% Fly Ash Source 1 | 1356 | 799 | 3219 | 5125 |
| 60% TI-II/24% Ignimbrite/ 16% Fly Ash Source 2 | 1415 | 1162 | 4110 | 5991 |
| 60% TI-II/20% Ignimbrite/ 20% Fly Ash Source 3 | 1922 | 468 | 4202 | 8139 |
| 60% TI-II/20% Ignimbrite/ 20% Fly Ash Source 4 | 1684 | 859 | 3957 | 6178 |
| 60% TI-II/16% Ignimbrite/ 24% Fly Ash Source 4 | 1569 | 935 | 4272 | 6183 |
| 60% TI-II/20% Ignimbrite/ 20% Fly Ash Source 5 | 1719 | 1127 | 3971 | 6304 |
| 60% TI-II/10% Ignimbrite/ 30% Fly Ash Source 5 | 1531 | 1245 | 4159 | 6479 |

FIG. 6

| Cementitious Mix Design | Strength (psi) at 1 Day, 38°C | Strength (psi) at 1 Day, 21°C | Strength (psi) at 7 Days, 21°C | Strength (psi) at 28 Days, 21°C |
|---|---|---|---|---|
| 100% TI-II | 2091 | 1856 | 4205 | 7272 |
| 60% TI-II/ 40% Fly Ash Source 1 | 1203 | 544 | 2139 | 4336 |
| 60% TI-II/20% Slag*/ 20% Fly Ash Source 1 | 2212 | 1315 | 4569 | 6809 |
| 60% TI-II/10% Slag/ 30% Fly Ash Source 1 | 1532 | 1204 | 3587 | 5207 |
| 60% TI-II/24% Slag/ 16% Fly Ash Source 2 | 1766 | 780 | 4523 | 6303 |
| 60% TI-II/20% Slag/ 20% Fly Ash Source 3 | 2050 | 605 | 4863 | 8139 |
| 60% TI-II/16% Slag/ 24% Fly Ash Source 4 | 1251 | 519 | 4228 | 6547 |
| 60% TI-II/20% Slag/ 20% Fly Ash Source 5 | 1769 | 495 | 4558 | 7204 |
| 60% TI-II/10% Slag/ 30% Fly Ash Source 5 | 1948 | 1111 | 4385 | 7244 |

* Ground granulated blast-furnace slag

FIG. 7

| Cementitious Mix Design | Strength (psi) at 1 Day, 38°C | Strength (psi) at 1 Day, 21°C | Strength (psi) at 7 Days, 21°C | Strength (psi) at 28 Days, 21°C |
|---|---|---|---|---|
| 100% TI-II | 2091 | 1856 | 4205 | 7272 |
| 60% TI-II/ 40% Fly Ash Source 1 | 1203 | 544 | 2139 | 4336 |
| 60% TI-II/40% Pumice* | 2066 | 1685 | 4175 | 6607 |
| 60% TI-II/20% Pumice/ 20% Fly Ash Source 1 | 1910 | 1327 | 4114 | 6607 |
| 60% TI-II/10% Pumice/ 30% Fly Ash Source 1 | 1498 | 1177 | 3465 | 5176 |
| 60% TI-II/24% Pumice/ 16% Fly Ash Source 2 | 1497 | 1335 | 3957 | 6211 |
| 60% TI-II/20% Pumice/ 20% Fly Ash Source 3 | 2047 | 382 | 4797 | 6117 |
| 60% TI-II/24% Pumice/ 16% Fly Ash Source 3 | 1168 | 270 | 3333 | 6271 |
| 60% TI-II/20% Pumice/ 20% Fly Ash Source 4 | 1783 | 1086 | 4007 | 6547 |
| 60% TI-II/16% Pumice/ 24% Fly Ash Source 4 | 1274 | 713 | 4006 | 6031 |
| 60% TI-II/20% Pumice/ 20% Fly Ash Source 5 | 1391 | 1015 | 3954 | 5984 |
| 60% TI-II/10% Pumice/ 30% Fly Ash Source 5 | 2016 | 1159 | 4118 | 6614 |

* Pumice in this table is ultrafine (median particle size 3 microns), Source No. 1

FIG. 8A

| Cementitious Mix Design | Strength (psi) at 1 Day, 38°C | Strength (psi) at 1 Day, 21°C | Strength (psi) at 7 Days, 21°C | Strength (psi) at 28 Days, 21°C |
|---|---|---|---|---|
| 100% TI-II | 2091 | 1856 | 4205 | 7272 |
| 60% TI-II/ 40% Fly Ash Source 1 | 1203 | 544 | 2139 | 4336 |
| 60% TI-II/40% Pumice* | 2031 | 1510 | 3995 | 7035 |
| 60% TI-II/20% Pumice/ 20% Fly Ash Source 1 | 1726 | 1149 | 3495 | 6468 |
| 60% TI-II/20% Pumice/ 20% Fly Ash Source 1 | 2156 | 1142 | 4021 | 6591 |
| 60% TI-II/10% Pumice/ 30% Fly Ash Source 1 | 1682 | 992 | 3209 | 5027 |
| 60% TI-II/24% Pumice/ 16% Fly Ash Source 2 | 1719 | 1477 | 4098 | 6242 |
| 60% TI-II/26% Pumice/ 14% Fly Ash Source 2 | 1573 | 1286 | 4032 | 7410 |
| 60% TI-II/20% Pumice/ 20% Fly Ash Source 3 | 2149 | 481 | 5819 | 7856 |
| 60% TI-II/20% Pumice/ 20% Fly Ash Source 3 | 2234 | 178 | 5660 | 7180 |
| 60% TI-II/26% Pumice/ 14% Fly Ash Source 3 | 1907 | 441 | 5073 | 9358 |
| 60% TI-II/20% Pumice/ 20% Fly Ash Source 4 | 1811 | 1085 | 3924 | 6176 |
| 60% TI-II/16% Pumice/ 24% Fly Ash Source 4 | 1389 | 799 | 4075 | 6832 |
| 60% TI-II/20% Pumice/ 20% Fly Ash Source 5 | 1911 | 1162 | 4518 | 6386 |
| 60% TI-II/10% Pumice/ 30% Fly Ash Source 5 | 1996 | 1084 | 4315 | 7397 |

* Pumice in this table is 100% passing a 325 mesh

FIG. 8B

| Cementitious Mix Design | Strength (psi) at 1 Day, 38°C | Strength (psi) at 1 Day, 21°C | Strength (psi) at 7 Days, 21°C | Strength (psi) at 28 Days, 21°C |
|---|---|---|---|---|
| 60% TI-II/39.6% Pumice*/ 0.4% Fly Ash Source 2 | 2263 | 2104 | 4349 | 7636 |
| 60% TI-II/36% Pumice/ 4% Fly Ash Source 2 | 2174 | 2155 | 4801 | 8356 |
| 60% TI-II/32% Pumice/ 8% Fly Ash Source 2 | 2435 | 1926 | 4468 | 8050 |
| 60% TI-II/12% Pumice/ 28% Fly Ash Source 2 | 1254 | 1308 | 4405 | 7197 |
| 60% TI-II/8% Pumice/ 32% Fly Ash Source 2 | 1117 | 1295 | 4385 | 6328 |
| 60% TI-II/4% Pumice/ 36% Fly Ash Source 2 | 990 | 958 | 3402 | 6344 |
| 60% TI-II/0.4% Pumice/ 39.6% Fly Ash Source 2 | 910 | 898 | 2501 | 5521 |
| 60% TI-II/39.6% Pumice/ 0.4% Fly Ash Source 4 | 2454 | 2012 | 4748 | 8552 |
| 60% TI-II/36% Pumice/ 4% Fly Ash Source 4 | 2301 | 2034 | 4553 | 8292 |
| 60% TI-II/32% Pumice/ 8% Fly Ash Source 4 | 1773 | 1359 | 4443 | 6598 |
| 60% TI-II/12% Pumice/ 28% Fly Ash Source 4 | 1087 | 875 | 4101 | 6494 |
| 60% TI-II/8% Pumice/ 32% Fly Ash Source 4 | 1000 | 935 | 4009 | 6506 |
| 60% TI-II/4% Pumice/ 36% Fly Ash Source 4 | 970 | 548 | 3910 | 6503 |
| 60% TI-II/0.4% Pumice/ 39.6% Fly Ash Source 4 | 877 | 300 | 3505 | 5001 |

* Pumice in this table is 100% passing a 325 mesh

FIG. 9

| Cementitious Mix Design | Strength (psi) at 1 Day, 38°C | Strength (psi) at 1 Day, 21°C | Strength (psi) at 7 Days, 21°C | Strength (psi) at 28 Days, 21°C |
|---|---|---|---|---|
| 100% TI-II | 2091 | 1856 | 4205 | 7272 |
| 60% TI-II/ 40% Fly Ash Source 1 | 1203 | 544 | 2139 | 4336 |
| 60% TI-II/20% CaAlSiO*/ 20% Fly Ash Source 1 | 1576 | 777 | 3662 | 5825 |
| 60% TI-II/10% CaAlSiO/ 30% Fly Ash Source 1 | 1235 | 681 | 2538 | 4791 |
| 60% TI-II/24% CaAlSiO/ 16% Fly Ash Source 2 | 1698 | 1019 | 3370 | 5364 |
| 60% TI-II/16% CaAlSiO/ 24% Fly Ash Source 4 | 1207 | 675 | 3451 | 5883 |
| 60% TI-II/10% CaAlSiO/ 30% Fly Ash Source 5 | 1494 | 1001 | 4092 | 6033 |

* CaAlSiO is vitrified calcium alumino-silicate material (ground waste glass or fiberglass)

FIG. 10

| Cementitious Mix Design | Strength (psi) at 1 Day, 38°C | Strength (psi) at 1 Day, 21°C | Strength (psi) at 7 Days, 21°C | Strength (psi) at 28 Days, 21°C |
|---|---|---|---|---|
| 100% TI-II | 2091 | 1856 | 4205 | 7272 |
| 60% TI-II/ 40% Fly Ash Source 1 | 1203 | 544 | 2139 | 4336 |
| 60% TI-II/24% Pumice*/ 16% Fly Ash Source 2 | 1687 | 1031 | 3762 | 5850 |
| 60% TI-II/26% Pumice/ 14% Fly Ash Source 2 | 1611 | 1340 | 4235 | 8166 |
| 60% TI-II/24% Pumice/ 16% Fly Ash Source 3 | 1218 | 284 | 2089 | 4577 |
| 60% TI-II/26% Pumice/ 14% Fly Ash Source 3 | 1773 | 454 | 4672 | 8164 |
| 60% TI-II/20% Pumice/ 20% Fly Ash Source 4 | 1595 | 1150 | 3890 | 6576 |
| 60% TI-II/16% Pumice/ 24% Fly Ash Source 4 | 1223 | 731 | 3987 | 6903 |
| 60% TI-II/10% Pumice/ 30% Fly Ash Source 5 | 1962 | 1035 | 4376 | 7589 |

* Pumice in this table is ultrafine (median particle size 3 microns), Source No. 2

FIG. 11

Chemical and Physical Analysis of Fly Ash

Developed For: *CR Minerals Corporation, LLC*
*6517 Castle Pines Rd.*
*Fort Worth, TX 76132*

| CTL Ticket: *14260* | Plant of Origin: | Sample Date Range: |
|---|---|---|
| CTL Project: *15634* | Sample ID: *Remediated Unit 1* | to: |
| Report Date: *03/11/2015* | Docket: - | Date Received: *12/08/2014* |

| Chemical Composition (%) (by Wyoming Analytical Laboratories, Inc.) | | | ASTM C618-12a Specifications | |
|---|---|---|---|---|
| | | | Class F | Class C |
| Total Silica, Aluminum, Iron: | *74.3* | | 70.0 Min | 50.0 Min |
| Silicon Dioxide: | | *58.5* | | |
| Aluminum Oxide: | | *13.2* | | |
| Iron Oxide: | | *2.6* | | |
| Sulfur Trioxide: | *4.1* | | 5.0 Max | 5.0 Max |
| Calcium Oxide: | *9.6* | | | |
| Moisture Content: | *0.8* | | 3.0 Max | 3.0 Max |
| Loss on Ignition: | *2.9* | | 6.0 Max | 6.0 Max |
| | | | AASHTO M295-11 Specifications | |
| Available Alkalies (as $Na_2O$): | *1.3* | | 1.5 Max | 1.5 Max |
| Sodium Oxide: | | *0.86* | | |
| Potassium Oxide: | | *0.60* | | |

| Physical Test Results | | ASTM C618-12a Specifications | |
|---|---|---|---|
| | | Class F | Class C |
| Fineness, Retained on #325 Sieve (%): | *4.0* | 34 Max | 34 Max |
| Strength Activity Index (%) | | | |
| Ratio to Control @ 7 Days: | *89.6* | | |
| Ratio to Control @ 28 Days: | *112.9* | 75 Min | 75 Min |
| Water Requirement, % of Control: | *100.8* | 105 Max | 105 Max |
| Soundness, Autoclave Expansion (%): | *0.01* | 0.8 Max | 0.8 Max |
| Drying Shrinkage, Increase @ 28 Days (%): | *0.01* | 0.03 Max | 0.03 Max |
| Density $Mg/m^3$: | *2.27* | | |

Comments: *Meets Class F, ASTM C618 and AASHTO M295*

CTL | Thompson Materials Engineers, Inc.

Orville R. Werner II, P.E.

22 Lipan Street | Denver, Colorado 80223 | Telephone: 303-825-0777  Fax: 303-893-1568
This test report relates only to the items tested and shall not be reproduced, except in full, without written approval of CTL Thompson, Inc.

FIG. 12

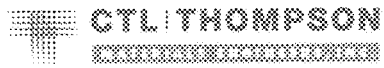

Chemical and Physical Analysis of Fly Ash

Developed For:

| CTL Ticket: 15027 | Plant of Origin: xfly ash | Sample Date Range: |
| CTL Project: 15911 | Sample ID: | to: |
| Report Date: 05/21/2015 | Docket: RFASP Class F - Series 0 | Date Received: 03/26/2015 |

| Chemical Composition (%) (by Wyoming Analytical Laboratories, Inc.) | | ASTM C618-12a Specifications | |
|---|---|---|---|
| | | Class F | Class C |
| Total Silica, Aluminum, Iron: | 75.5 | 70.0 Min | 50.0 Min |
| Silicon Dioxide: | 59.1 | | |
| Aluminum Oxide: | 12.8 | | |
| Iron Oxide: | 3.7 | | |
| Sulfur Trioxide: | 3.5 | 5.0 Max | 5.0 Max |
| Calcium Oxide: | 6.2 | | |
| Moisture Content: | 0.6 | 3.0 Max | 3.0 Max |
| Loss on Ignition: | 6.8 | 6.0 Max | 6.0 Max |

| Physical Test Results | | ASTM C618-12a Specifications | |
|---|---|---|---|
| | | Class F | Class C |
| Fineness, Retained on #325 Sieve (%): | 12.9 | 34 Max | 34 Max |
| Strength Activity Index (%) | | | |
| Ratio to Control @ 7 Days: | 110.3 | | |
| Ratio to Control @ 28 Days: | 124.7 | 75 Min | 75 Min |
| Water Requirement, % of Control: | 102.0 | 105 Max | 105 Max |
| Soundness, Autoclave Expansion (%): | -0.01 | 0.8 Max | 0.8 Max |
| Density Mg/m$^3$: | 2.43 | | |

Comments: *Meets Class F (except LOI), ASTM and AASHTO*

CTL | Thompson Materials Engineers, Inc.

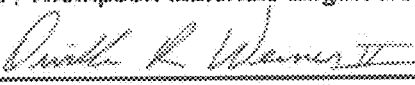
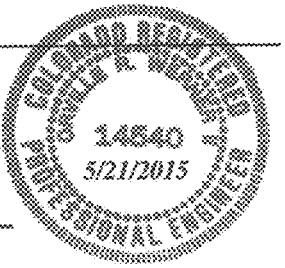

Orville R. Werner II, P.E.

22 Lipan Street | Denver, Colorado 80223 | Telephone: 303-825-0777 Fax: 303-693-1566
This test report relates only to the items tested and shall not be reproduced, except in full, without written approval of CTL Thompson, Inc.

FIG. 13

Chemical and Physical Analysis of Fly Ash

Developed For: *CR Minerals*
*P.O. Box 708*
*Ohkay Owingeh, NM 87566*

| CTL Ticket: *15028* | Plant of Origin: *xfly ash* | Sample Date Range: |
| CTL Project: *15911* | Sample ID: | to: |
| Report Date: *05/20/2015* | Docket: *RFAGC Class F - Series 0* | Date Received: *03/26/2015* |

| Chemical Composition (%) <br>(by Wyoming Analytical Laboratories, Inc.) | | | ASTM C618-12a Specifications | |
|---|---|---|---|---|
| | | | Class F | Class C |
| Total Silica, Aluminum, Iron: | *76.2* | | 70.0 Min | 50.0 Min |
| Silicon Dioxide: | | *57.1* | | |
| Aluminum Oxide: | | *15.7* | | |
| Iron Oxide: | | *3.4* | | |
| Sulfur Trioxide: | *0.6* | | 5.0 Max | 5.0 Max |
| Calcium Oxide: | *10.8* | | | |
| Moisture Content: | *0.3* | | 3.0 Max | 3.0 Max |
| Loss on Ignition: | *1.9* | | 6.0 Max | 6.0 Max |

| Physical Test Results | | ASTM C618-12a Specifications | |
|---|---|---|---|
| | | Class F | Class C |
| Fineness, Retained on #325 Sieve (%): | *4.5* | 34 Max | 34 Max |
| Strength Activity Index (%) | | | |
| Ratio to Control @ 7 Days: | *108.0* | | |
| Ratio to Control @ 28 Days: | *132.5* | 75 Min | 75 Min |
| Water Requirement, % of Control: | *95.5* | 105 Max | 105 Max |
| Soundness, Autoclave Expansion (%): | *-0.01* | 0.8 Max | 0.8 Max |
| Density Mg/m$^3$: | *2.56* | | |

Comments: *Meets Class F, ASTM C618 and AASHTO M295*

CTL | Thompson Materials Engineers, Inc.

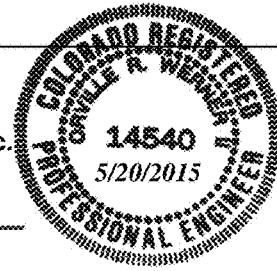

Orville R. Werner II, P.E.

22 Lipan Street | Denver, Colorado 80223 | Telephone: 303-825-0777 Fax: 303-893-1568
This test report relates only to the items tested and shall not be reproduced, except in full, without written approval of CTL Thompson, Inc.

POZZOLANIC COMPOSITIONS CONTAINING FLY ASH AND REMEDIATION AGENTS FOR USE IN CEMENTITIOUS MATERIALS

PRIORITY DATA

This patent application is a continuation application of U.S. Pat. No. 10,689,292, issued on Jun. 23, 2020, which is a continuation of U.S. Pat. No. 10,017,418, issued on Jul. 10, 2018, which is a continuation of U.S. Pat. No. 9,611,174, issued on Apr. 4, 2017, which is a continuation of U.S. Pat. No. 9,561,983, issued on Feb. 7, 2017, which is a non-provisional application of U.S. Provisional Patent App. No. 62/016,965, filed on Jun. 25, 2014, each of which is hereby incorporated by reference herein.

FIELD OF THE DISCLOSURE

The present disclosure generally relates to fly ash remediation and/or beneficiation, pozzolanic compositions for use in concrete, and methods relating to the foregoing.

BACKGROUND OF THE DISCLOSURE

Molten lava, flash frozen upon explosive expulsion from the volcanic vent, instantly became what the Romans called "pozzolana"—pumice pozzolan, the key ingredient in Roman concrete. Roman structures such as aqueducts used volcanic ash as pozzolan in their concrete. Concretes using natural (pumice) pozzolan have proven to last thousands of years. Pozzolans fortify concrete, providing protection by mitigating various forms of chemical attack such as alkali-silica reaction (ASR), sulfate induced expansion, efflorescence, as well as rebar oxidation and debondment caused by the ingress of chlorides. Pozzolans also densify concrete, reducing porosity and permeability, thereby reducing chemical ingress and increasing long-term compressive strength and durability.

Fly ash, also known as flue-ash, is one of the residues generated in coal combustion and comprises the fine particles that rise with the flue gases. In an industrial context, fly ash usually refers to ash produced during combustion of coal. Fly ash is generally captured by electrostatic precipitators or other particle filtration equipment before the flue gases reach the chimneys of coal-fired power plants. Depending upon the source and makeup of the coal being burned, the components of fly ash vary considerably, but all fly ash includes substantial amounts of silica (silicon dioxide, $SiO_2$), alumina (aluminum oxide, $Al_2O_3$), iron oxide ($Fe_2O_3$), calcium oxide (CaO), and various metals.

In the past, fly ash was generally released into the atmosphere, but pollution control mandated in recent decades now requires that it be captured prior to release. Fly ash, particularly Class F fly ash, can be used as a pozzolan to enhance hydraulic cement or hydraulic plaster. Fly ash can be used as a replacement for some of the Portland cement content of concrete. Fly ash has historically been available at much lower cost than natural pozzolans as it is a waste material of coal-fired power plants with associated disposal costs.

Fly ash pozzolan, which is typically less expensive than a natural pozzolan, is generally used when chemical attack, such as alkali-silica reaction (ASR), is not expected to be severe. Furthermore, fly ash pozzolan is preferred when concrete with a low water-to-cement ratio is desirable. In general, fly ash creates less water demand than does a natural pozzolan. However, when chemical attack, such as ASR, is expected to be severe, a natural pozzolan would be a better choice.

Two classes of fly ash are defined by ASTM C618: Class F fly ash and Class C fly ash. The primary difference between these classes is the amount of calcium, silica, alumina, and iron content in the ash. The chemical properties of the fly ash are largely influenced by the chemical content of the coal burned.

The burning of harder, older anthracite and bituminous coal typically produces Class F fly ash. This fly ash is pozzolanic in nature, and contains less than 20% lime (CaO). Possessing pozzolanic properties, the glassy silica and alumina of Class F fly ash requires a cementing agent, such as Portland cement, quicklime, or hydrated lime, with the presence of water in order to react and produce cementitious compounds. Calcium Hydroxide ($Ca(OH)_2$), the major byproduct of the hydraulic reaction between cement and water, is the key chemical with which pozzolan reacts to form additional Calcium Silicate Hydrate (C—S—H), the binder in all Portland cement-based concretes.

Fly ash produced from the burning of younger lignite or subbituminous coal, Class C fly ash, in addition to having pozzolanic properties, also has some self-cementing properties. In the presence of water, Class C fly ash will harden and gain strength over time. Class C fly ash generally contains more than 20% lime (CaO). Unlike Class F fly ash, self-cementing Class C fly ash does not require an activator.

For the coal power industry, concrete has been a convenient market for fly ash. For concrete companies, fly ash has been a low-cost source of pozzolans. However, recently, a supply problem has started to emerge. Namely, due to increasing environmental regulations of power plants, the quantity and quality of fly ash has been decreasing. There is a declining availability of fly ash, particularly Class F fly ash, of suitable quality for use as a pozzolan in concrete. This situation is expected to worsen in the coming years.

In view of the challenges in two industries (electrical power and concrete), what is needed is a method to upgrade the pozzolanic quality of fly ash. In particular, it would be desirable to generate a remediating or beneficiating agent and process whereby non-certifiable, poor-quality fly ash, often referred to as non-spec fly ash, may be upgraded in quality in order to achieve certification under ASTM C618-12 and AASHTO M295.

SUMMARY OF THE DISCLOSURE

In some variations, the present disclosure provides a pozzolanic composition for use in concrete, the composition comprising fly ash combined with a natural pozzolan.

In some embodiments, the natural pozzolan is present in a concentration of about 1 wt % to about 99 wt %, such as about 10 wt % to about 90 wt %, about 30 wt % to about 70 wt %, about 40 wt % to about 60 wt %, or about 60 wt % to about 70 wt %.

In some embodiments, a weight ratio of the natural pozzolan to the fly ash is from about 0.01 to about 100, such as about 0.1 to about 10, or about 1 to about 2.

The natural pozzolan may be a pozzolanic, volcanic ash, such as (but not limited to) a pozzolan derived from tephra, tuff, pumicite or pumice (collectively referred to as "pumice" hereafter) or perlite. In some embodiments, the natural pozzolan is selected from the group consisting of pumice, perlite, metakaolin, diatomaceous earth, ignimbrites, calcined shale, calcined clay, and combinations thereof. Other by-product pozzolans such as silica fume, ground glass, vitrified calcium alumino-silicates, and high silica content Class F fly ash may also be used as remediation or beneficiation agents. Ground granulated blast furnace slag may, in certain circumstances, also be used as a remediation or beneficiation agent to enhance or improve poor quality non-spec fly ash into a fly ash that meets ASTM C618.

In some embodiments, the pozzolanic composition is certified under ASTM C618-12 as a Class F pozzolan. In these or other embodiments, the composition may be certified under AASHTO M295 as a Class F pozzolan.

The pozzolanic composition may further comprise an additive to adjust viscosity of the composition. The pozzolanic composition may further comprise an additive to adjust water demand of the composition in concrete.

This disclosure also provides a cementitious mixture comprising a pozzolanic composition for use in concrete, the composition comprising fly ash combined with a natural pozzolan or other pozzolans. In some variations, a concrete product or structure is provided, comprising an aggregate and the cementitious mixture as disclosed, or a reaction product thereof. In some variations, a concrete product or structure is provided, comprising an aggregate and a pozzolanic composition or a reaction product thereof, wherein the pozzolanic composition comprises fly ash combined with a natural pozzolan or another efficacious pozzolan.

This disclosure also provides a method of producing a pozzolanic composition for use in concrete, the method comprising:
providing a source of fly ash;
providing a natural pozzolan or other efficacious pozzolan; and
combining the fly ash with the natural pozzolan (or other pozzolan), to produce a pozzolanic composition.

This disclosure also provides a method of upgrading a fly ash as a pozzolanic material, the method comprising:
providing a starting fly ash;
providing a natural pozzolan or other efficacious pozzolan; and
combining the starting fly ash with the natural pozzolan (or other pozzolan), to produce an upgraded fly ash with enhanced pozzolanic properties compared to the starting fly ash.

This disclosure also provides a method of beneficiating a non-spec fly ash or converting a Class C fly ash to a certifiable Class F fly ash, the method comprising:
providing a certified Class C ash or a non-certifiable fly ash;
providing a natural pozzolan or other efficacious pozzolan; and
combining the Class C fly ash or non-certifiable fly ash with the natural pozzolan (or other pozzolan), to produce a Class F fly ash.

In some method embodiments, the natural or other pozzolan is present in a concentration of about 1 wt % to about 99 wt % in the pozzolanic composition, upgraded fly ash, or Class F fly ash. In certain embodiments, the natural or other pozzolan is present in a concentration of about 10 wt % to about 90 wt %, such as about 30 wt % to about 70 wt %, about 40 wt % to about 60 wt %, or about 60 wt % to about 70 wt % in the pozzolanic composition, upgraded, enhanced, or converted fly ash, or Class F fly ash.

In these methods, the natural pozzolan may be selected from the group consisting of calcined or uncalcined pozzolanic materials such as pumice- or perlite-derived pozzolan, calcined shale, calcined clay, metakaolin, and combinations thereof. Other pozzolans such as silica fume, ground glass, and certified Class F fly ash containing a high percentage of silica, alumina, and iron may also be used.

In some methods, the pozzolanic composition, upgraded fly ash, or Class F fly ash is certified under ASTM C618-12. In these or other methods, the pozzolanic composition, upgraded fly ash, or Class F fly ash is certified under AASHTO M295.

BRIEF DESCRIPTION OF THE FIGURES

FIG. 1 is a table of experimental data summarizing compressive strengths of cementitious materials containing pozzolanic compositions that include various sources of fly ash along with pumice.

FIG. 2 is a table of experimental data summarizing compressive strengths of cementitious materials containing pozzolanic compositions that include various sources of fly ash along with metakaolin.

FIG. 3 is a table of experimental data summarizing compressive strengths of cementitious materials containing pozzolanic compositions that include various sources of fly ash along with diatomaceous earth.

FIG. 4 is a table of experimental data summarizing compressive strengths of cementitious materials containing pozzolanic compositions that include various sources of fly ash along with silica fume.

FIG. 5 is a table of experimental data summarizing compressive strengths of cementitious materials containing pozzolanic compositions that include various sources of fly ash along with ignimbrite.

FIG. 6 is a table of experimental data summarizing compressive strengths of cementitious materials containing pozzolanic compositions that include various sources of fly ash along with ground granulated blast-furnace slag.

FIG. 7 is a table of experimental data summarizing compressive strengths of cementitious materials containing pozzolanic compositions that include various sources of fly ash along with ultrafine (3 micron) pumice (Source No. 1).

FIG. 8A is a table of experimental data summarizing compressive strengths of cementitious materials containing pozzolanic compositions that include various sources of fly ash along with pumice.

FIG. 8B is a continuation of the table in FIG. 8A, experimental data summarizing compressive strengths of cementitious materials containing pozzolanic compositions that include various sources of fly ash along with pumice.

FIG. 9 is a table of experimental data summarizing compressive strengths of cementitious materials containing pozzolanic compositions that include various sources of fly ash along with vitrified calcium alumino-silicate material (ground waste glass or fiberglass).

FIG. 10 is a table of experimental data summarizing compressive strengths of cementitious materials containing pozzolanic compositions that include various sources of fly ash along with ultrafine (3 micron) pumice (Source No. 2).

FIG. 11 is an ASTM C618 certification demonstrating the conversion of non-spec fly ash into a certified Class F fly ash, according to some embodiments.

FIG. 12 is an ASTM C618 certification demonstrating the conversion of non-spec fly ash into a certified Class F fly ash, according to some embodiments.

FIG. 13 is an ASTM C618 certification demonstrating the conversion of Class C fly ash into a certified Class F fly ash, according to some embodiments.

DETAILED DESCRIPTION OF EMBODIMENTS OF THE DISCLOSURE

Certain embodiments of the present disclosure will now be further described in more detail, in a manner that enables the claimed invention to be understood so that a person of ordinary skill in this art can make use of the present disclosure.

Unless otherwise indicated, all numbers expressing reaction conditions, concentrations, yields, and so forth used in the specification and claims are to be understood as being modified in all instances by the term "about." Accordingly, unless indicated to the contrary, the numerical parameters set forth in the following specification and attached claims are approximations that may vary depending at least upon the specific analytical technique. Any numerical value inherently contains certain errors necessarily resulting from the standard deviation found in its respective testing measurements.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this disclosure belongs. If a definition set forth in this section is contrary to or otherwise inconsistent with a definition set forth in patents, published patent applications, and other publications that are incorporated by reference, the definition set forth in this specification prevails over the definition that is incorporated herein by reference.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

It has now been unexpectedly discovered that the addition of natural pozzolans, as well as other previously identified pozzolans, enhances the chemical and pozzolanic performance properties of various fly ashes. Even more surprising, non-certifiable waste fly ash was so improved by the addition of a natural pozzolanic agent, it was able to achieve a Class F (a better performing pozzolan than Class C) certification under ASTM C618 and AASHTO 295. Furthermore, the added natural pozzolan did not create any unexpected water demand in the fly ash. The added natural pozzolan enhanced a poor-quality fly ash (Class F or Class C) or non-spec fly ash to the point that it became a high-performance, certified Class F pozzolanic fly ash.

Whereas Class F pozzolanic fly ash is periodically in short supply in certain locations in North America, the discovery can extend diminishing Class F fly ash supplies. With over 150 coal-fired power plants scheduled to be shut down or converted to natural gas in the next decade, Class F fly ash shortages will likely be exacerbated. Utilizing natural pozzolanic agents (and other pozzolans) may allow for the extension or remediation/beneficiation of currently available fly ash supplies, both certified and non-certified. Additionally, natural pozzolanic agents may be used to convert Class C fly ash into a more desirable Class F pozzolan.

The methods disclosed herein may facilitate the long-term availability of certified fly ash pozzolan, which is needed to produce economically viable, durable and chemically resistant concretes now, and in the future.

When a natural or other pozzolan is mixed with a poor-quality fly ash at an appropriate percentage (as disclosed in more detail below), a previously non-certifiable fly ash is enhanced to a level that will allow for pozzolan certification via ASTM C618-12 and AASHTO M295.

When a natural or other pozzolan is mixed at an appropriate percentage (as disclosed in more detail below), Class C fly ash, a less-desirable pozzolan than Class F fly ash, may be converted to meet Class F certification requirements, a more desirable pozzolan.

A previously non-certifiable fly ash, mixed at an appropriate level with a natural pozzolan (or other pozzolans, as disclosed in more detail below), exhibits pozzolanic qualities that meet or exceed the performance of most any currently certified fly ash available in North America, Class F or Class C.

The present disclosure may facilitate the remediation of poor-quality, non-certifiable, currently wasted fly ash into a very useful Class F pozzolan which may be certified under both ASTM C618-12 and AASHTO M295. Class F pozzolans are used in a great variety of concrete mix designs in order to improve the concrete's performance characteristics. The present disclosure may also be used to remediate non-certifiable fly ash, enhancing it to a certifiable quality Class C or Class F fly ash. The present disclosure may also be used to extend the quantities and availability of good quality certified, Class F fly ash.

The present disclosure facilitates the removal of poor-quality fly ash from the waste stream or existing fly ash landfill/waste deposit and converts it into a very useful product for which there is strong demand in the production of concrete for homes, buildings, and infrastructure. The present disclosure may also find use in oil field cementing slurries used to secure oil well casings as well as prevent loss of oil to the formation during extraction.

The present disclosure may be used by cement companies to produce a "1P cement." 1P cements have been altered by the addition of a pozzolanic material to provide pozzolanic advantages to the concrete in which it is mixed. Pozzolanic qualities include, but are not limited to: mitigating one form of chemical attack or another, such as ASR, alkali-sulfate reactions, and the damaging effects of chloride ingress, particularly the oxidation and debonding of reinforcing steel; concrete densification and impermeability enhancement, increased long-term compressive strength, and mitigation of efflorescence.

The present disclosure may be utilized by coal-fired generation plants or their partners to enhance and remediate non-certifiable fly ash in manner that would make the fly ash salable as a high performance Class F fly ash, or with less remediation/beneficiation, a Class C fly ash. This relates to fly ash that otherwise would be placed (or already exists) in waste ponds or landfills, creating a direct cost in terms of daily and long-term containment activities and an indirect cost in terms of potential environmental hazards that would stem from pond or containment leaks, or the leaching of contaminants into soils and groundwater.

In some variations, the present disclosure provides a pozzolanic composition for use in concrete, the composition comprising fly ash combined with a natural or other pozzolan. By "combined" it is meant that the fly ash and natural pozzolan are physically mixed together; chemical reactions will typically not occur without the addition of water, although chemical combinations (such as equilibrium exchange reactions) are by no means excluded.

In some embodiments, the natural pozzolan is present in a concentration of about 1 wt % to about 99 wt %, such as about 10 wt % to about 90 wt %, about 30 wt % to about 70 wt %, about 40 wt % to about 60 wt %, or about 60 wt % to about 70 wt % of the pozzolanic composition. In various embodiments, the natural pozzolan is present in a concentration of about 1, 2, 5, 10, 15, 20, 25, 30, 35, 40, 45, 50, 55, 60, 65, 70, 75, 80, 85, 90, or 95 wt % of the pozzolanic composition.

In various embodiments, the fly ash is present in a concentration of about 1, 2, 5, 10, 15, 20, 25, 30, 35, 40, 45, 50, 55, 60, 65, 70, 75, 80, 85, 90, or 95 wt % of the pozzolanic composition.

The pozzolanic composition may or may not include components in addition to the fly ash and natural pozzolan. For example, additives or admixtures may also be introduced. These additives may be added to adjust the properties of the pozzolanic composition itself, or to provide admixture properties for the ultimate cement or concrete. The pozzolanic composition may comprise an additive to adjust viscosity of the composition. The pozzolanic composition may further comprise an additive to adjust water demand of the composition in concrete. Also, impurities may be present.

In some embodiments of the pozzolanic composition, a weight ratio of the natural pozzolan to the fly ash is from about 0.01 to about 100, such as about 0.1 to about 10, or about 1 to about 2. In various embodiments, the weight ratio of the natural pozzolan to the fly ash is about 0.02, 0.05, 0.1, 0.2, 0.3, 0.5, 0.8, 1, 2, 3, 5, 8, 10, 15, 25, 50, 75, or 90, for example.

In this disclosure, a "natural pozzolan", "other pozzolan," "natural or other pozzolan," and the like, should not be construed as limiting and refers to any efficacious pozzolan that can function as a fly ash remediation agent. A "fly ash remediation or beneficiation agent" is any supplementary cementitious material which possesses the chemical and physical properties necessary to enhance, convert, or remediate a waste fly ash or a Class C fly ash. In preferred embodiments, the fly ash remediation or beneficiation agent converts a waste fly ash or a Class C fly ash into a certifiable Class F fly ash, as defined by ASTM C618 and/or AASHTO M295. Additionally, the fly ash remediation agent is preferably able to remediate or enhance an already certified Class F fly ash, such that when used as a pozzolan in concrete, the enhanced or remediated Class F fly ash will, generally speaking, extend supply, reduce set times, enhance early compressive strength, and strengthen mitigation properties against chemical attack, such as sulfate, chloride, and alkali-silica reactions.

The natural pozzolan may be a pozzolanic ash, such as (but not limited to) a pozzolan derived from pumice or perlite. In some embodiments, the natural pozzolan is selected from the group consisting of calcined shale, calcined clay, metakaolin, and combinations thereof. The pozzolan may be (or may be derived from) a high-quality Class F fly ash, ground glass, silica fume, or other materials.

In various embodiments, the natural or other pozzolan and/or other supplementary cementitious materials may be selected from pumice (various size ranges), perlite, metakaolin, diatomaceous earth, silica fume, ignimbrites, ground granulated blast-furnace slag, vitrified calcium aluminosilicates, ground waste glass, or combinations or derivatives thereof.

Pumice, called pumicite in its powdered or dust form, is a volcanic rock that consists of highly vesicular rough textured volcanic glass, which may or may not contain crystals. Pumice is created when super-heated, highly pressurized rock is violently ejected from a volcano. Pumice is composed of highly micro-vesicular pyroclastic glass with thin, translucent bubble walls of extrusive igneous rock. It is commonly, but not exclusively, derived of silicic or felsic to intermediate composition magma (e.g., rhyolitic, dacitic, andesite, pantellerite, phonolite, trachyte). Pumice is commonly pale in color, ranging from white, cream, blue or grey, to green-brown or black.

Perlite is an amorphous volcanic glass that has a relatively high water content, typically believed to be formed by the hydration of obsidian. It occurs naturally and has the unusual property of greatly expanding when heated sufficiently. Scoria is another vesicular volcanic rock that differs from pumice in having larger vesicles and thicker vesicle walls and being dark colored and denser.

Silica fume is an amorphous, ultrafine powder that may be obtained from silicon-ferrosilicon alloy production. Ignimbrite is any of various forms of ground stone, typically referring to a finely ground, nearly pure form of silica or silicate. Ground-granulated blast-furnace slag is obtained by quenching molten iron slag (a by-product of iron and steel-making) from a blast furnace in water or steam, to produce a glassy, granular product that is then dried and ground into a fine powder. In some embodiments, vitrified calcium aluminio-silicate pozzolans may be made from recycled glass or fiberglass powders, from finely ground fresh glass powders, or a combination thereof.

In some embodiments, the natural or other pozzolan contains amorphous silica, amorphous alumina, and iron. The natural or other pozzolan of some embodiments is selected for its silica content. The natural or other pozzolan of some embodiments is selected for its alumina content. The natural or other pozzolan of some embodiments is selected for its combined silica/alumina and iron content.

In some embodiments, the natural or other pozzolan is selected for its high silica content and pozzolanic strength to be used as an additive to remediate poor quality fly ash to a degree that will transform the previously unusable fly ash into a useful Class F fly ash for use in the concrete or cement industries.

In some embodiments, the natural or other pozzolan is selected for its particle-size distribution, surface area, particle-shape distribution, density, viscosity, or other properties. For example, pumice-derived pozzolans may have an angular shape that creates higher water demand than fly ash pozzolans, which tend to have a spherical shape that creates less water demand.

Natural or other pozzolans may also be inter-ground with fly ash (as opposed to simply blending), in order to achieve a remediated or enhanced fly ash. Inter-grinding would reduce the particle size of the fly ash while increasing the surface area. This method of fly ash remediation or enhancement would increase the pozzolanic reactivity of the fly ash, thus increasing the reactivity of the remediated or enhanced fly ash which includes the natural pozzolan.

In some embodiments, the pozzolanic composition is certified under ASTM C618-12 ("Standard Specification for Coal Fly Ash and Raw or Calcined Natural Pozzolan for Use in Concrete") as a Class F pozzolan. In these or other embodiments, the composition may be certified under AASHTO M295 ("Standard Specification for Coal Fly Ash and Raw or Calcined Natural Pozzolan for Use in Concrete") as a Class F pozzolan. Both ASTM C618-12 and AASHTO M295 are hereby entirely incorporated by reference herein. It is also noted that pozzolanic compositions according to this disclosure may be alternatively, or additionally, certified under other standards or regulations, either presently existing or developed in the future, in the U.S. or other countries.

This disclosure also provides a supplementary cementitious mixture, comprising a pozzolanic composition for use in concrete, the composition comprising fly ash combined with a natural or other pozzolan. The pozzolanic composition provided by this disclosure may be incorporated into a concrete mix design, a cementitious mixture or other admixtures. Alternatively, instructions may be provided to introduce (combine) the fly ash and natural pozzolan components into a cementitious mixture or other admixture at a later time, for example, after mixing of primary cementitious products, aggregates, and water has already commenced.

In some variations, a concrete product or structure is provided, comprising the cementitious mixture as disclosed, or a reaction product thereof. In some variations, a concrete product or structure is provided, comprising a pozzolanic composition or a reaction product thereof, wherein the pozzolanic composition comprises fly ash combined with a natural pozzolan. The concrete products or structures are not particularly limited.

This disclosure also provides a method of producing a pozzolanic composition for use in concrete, the method comprising:
  providing a source of fly ash;
  providing a natural or other pozzolan; and
  combining the fly ash with the natural or other pozzolan, to produce a pozzolanic composition.

This disclosure also provides a method of upgrading a fly ash as a pozzolanic material, the method comprising:
  providing a starting fly ash;
  providing a natural or other pozzolan; and
  combining the starting fly ash with the natural or other pozzolan, to produce an upgraded fly ash with enhanced pozzolanic properties compared to the starting fly ash.

This disclosure also provides a method of converting a Class C fly ash to a Class F fly ash, the method comprising:
  providing a certified or non-certified Class C fly ash;
  providing a natural or other pozzolan; and
  combining the Class C fly ash with the natural or other pozzolan, to produce a Class F fly ash.

In some method embodiments, the natural or other pozzolan is present in a concentration of about 1 wt % to about 99 wt % in the pozzolanic composition, upgraded fly ash, or Class F fly ash. In certain embodiments, the natural or other pozzolan is present in a concentration of about 10 wt % to about 90 wt %, such as about 30 wt % to about 70 wt %, about 40 wt % to about 60 wt %, or about 60 wt % to about 70 wt % in the pozzolanic composition, upgraded fly ash, or Class F fly ash.

In these methods, the natural or other pozzolan may be selected from the group consisting of calcined or uncalcined pozzolanic ash (such as pumice-derived pozzolan) and perlite, calcined shale, calcined clay, DE, metakaolin, silica fume, and combinations thereof.

In some methods, the pozzolanic composition, upgraded fly ash, or Class F fly ash is certified under ASTM C618-12. In these or other methods, the pozzolanic composition, upgraded fly ash, or Class F fly ash is certified under AASHTO M295.

Examples

In these Examples, a wide variety of pozzolanic compositions comprising fly ash combined with a natural or other pozzolan are evaluated experimentally for use in cementitious materials. Many sources of fly ash and many pozzolan agents have been tested.

Type I/II cement ("TI-II" in the tables of FIGS. 1-10) is used for the control (100%) and as 60%, by weight, of all other mixes used in the testing program. The other 40 wt % of each mix is comprised of the various fly ashes, alone or in a remediated/enhanced configuration, using commercially available pozzolans as remediation agents.

Five separate fly ashes were remediated, converted, or enhanced in the testing program described in these Examples:
  Fly Ash Source 1=Class F Fly Ash, western U.S.
  Fly Ash Source 2=Non-Spec Fly Ash, OK
  Fly Ash Source 3=Non-Spec Fly Ash, CO
  Fly Ash Source 4=Class C Fly Ash, TX
  Fly Ash Source 5=Class C Fly Ash, MO
  Class F Fly Ash was tested. One currently ASTM C618 certified F ash (Source 1) was remediated or enhanced using the invention. The certified fly ash was also used as a control compare to other remediated, converted, and enhanced certifiable F ashes against a currently certified F ash.

Non-Spec Ashes (waste) are defined as non-certifiable fly ash under ASTM C618 and AASHTO M295. Two non-certifiable ashes were used in the testing, Fly Ash Source 2 and Fly Ash Source 3. These fly ashes were remediated or beneficiated using a fly ash remediation agent in order to achieve C618 certification as a Class F fly ash (see FIGS. 11 and 12).

Class C Fly Ash was also tested. Two currently ASTM C618 certified Class C ashes (Fly Ash Source 4 and Fly Ash Source 5) were remediated or converted to certifiable Class F ashes using invention. These fly ashes were remediated or converted using a fly ash remediation agent in order to achieve C618 certification as a Class F fly ash (see FIG. 13 for Source 4 results).

The following fly ash remediation agents have been evaluated experimentally in these Examples:
  Pumice (90% passing 325 mesh)
  Pumice (100% passing 325 mesh)
  Pumice (3 micron—two independent sources, Source Nos. 1 and 2)
  Metakaolin
  Diatomaceous Earth
  Silica Fume
  Ignimbrites
  Ground granulated blast-furnace slag (slag)
  Vitrified calcium alumino-silicate material, ground waste glass All samples were prepared in a mix where cement accounted for 60% of the cementitious material. The test regimen utilized a standard cement slurry mix design (no aggregate) for enhanced product differentiation. Water was mixed with the cement plus pozzolanic composition at about 18° C. degrees. The mixture was cured either at ambient temperature, about 21° C. (water bath), or at about 38° C. At ambient temperature, measurements were made after 1, 7, and 28 days of curing time.

The mix design itself is a cement slurry (grout) design which allowed for the use of 2"×4" cylinders to produce the samples. This simplified the batching and curing process in terms of time and available space. Also, no aggregate is included the mix design. These samples rely on the hydraulic and pozzolanic reactions and subsequent relative strengths between the various cementitious ingredients alone. Also, by using a fairly high 60/40 (cement/pozzolan) ratio, the relative strengths or reactivity of the assorted pozzolans are much more discernible.

The results are depicted in the tables of FIGS. 1-10. The strength data shown is compressive strength in pounds/sq. inch ($lbs/in^2$ or psi). Each table shows the compressive strength of 100% TI-II cement mix (row 1) for reference purposes only, as well as the compressive strength of C618 certified F ash (Fly Ash Source 1), as a control (row 2). The compressive strength at "1 Day" refers to a break test after curing the specimen for 1 day at about 21° C. immersed in a temperature-controlled water bath, "7 Days" refers to a break test after 7 days of curing the specimen for 7 days at about 21° C. immersed, "28 Days" refers to a break test after 28 days of curing the specimen for 28 days at about 21° C. immersed. The first data column shows the compressive strength under a break test after curing the specimen for 1 day at about 38° C. immersed.

All of the commercial pozzolans tested as fly ash remediation agents provided some degree of enhancement to the various fly ashes that were tested for compressive strength in over 100 batches of grout concrete. Class F fly ashes or natural pozzolans are added to cements and concretes in order to enhance the concrete's chemical resistance against sulfates, chlorides, and alkali-silica expansive reactions, and to mitigate against efflorescence. In most cases, pozzolans, including Class F fly ashes, do not enhance compressive strength until after the usual 7-day and 28-day compressive strength tests have been completed. In other words, strength enhancement in a concrete using Class F fly ash, versus a cement-only control, generally comes after at least 28 day of curing. There are, however, exceptions in the testing wherein a remediated/beneficiated or converted fly ash actually surpassed control in less than 28 days.

In all cases, it was discovered that by combining a natural or other pozzolan with fly ash, thereby creating a remediated fly ash, the pozzolanic qualities of the fly ash were improved. This performance enhancement was realized in terms of the ultimate compressive strength of the concrete to which the remediated fly ash was added; and the increased mitigation properties of the remediated fly ash in terms of protecting the host concrete from various forms of chemical attack (e.g., alkali-silica reaction, sulfate-induced expansion, and/or chloride ingress).

In all tested cases, dependent upon the exact mix ratio of natural or other pozzolan to fly ash, a non-spec fly ash was remediated to the point that it was able to be certified as a Class F pozzolan under ASTM C618 and AASHTO M295 specification standards. Without limitation, it is expected that essentially any currently non-certifiable fly ashes can be remediated with the properly chosen natural pozzolan in order to meet ASTM C618 certification for fly ash.

In all cases, dependent upon the exact mix ratio of natural pozzolan to fly ash, a certified Class C fly ash was successfully converted to allow for the Class C ash to be reclassified to a more desirable pozzolanic class of fly ash, namely as Class F fly ash (see FIG. 13). Without limitation, it is expected, based on the data in these Examples, that any certified Class C fly ashes can be successfully remediated and enhanced in order to meet ASTM C618 Class F certification standards.

Without limitation, it is also expected, based on this data, that any currently certified Class F fly ash can be enhanced in terms of the anticipated performance benefits when adding a pozzolan to a Portland cement-based concrete, mortar, or grout.

It was also discovered that industrial byproducts, such as silica fume and ground waste glass, can similarly enhance the performance of fly ash in terms of its use to improve concrete/mortar/grout compressive strength and mitigation of chemical attack. It was also discovered that ground granulated blast furnace slag (referred to as "slag") is able to enhance the performance characteristics of all forms of fly ash, both certified and uncertified.

Virtually every pozzolan enhances the various fly ashes to one degree or another, some very significantly. Therefore, the conclusion from the data in these Examples is that fly ash can be remediated by any pozzolan. A non-spec, normally wasted or land-filled fly ash can be remediated to an ASTM-certified pozzolanic Class F ash. An ASTM-certified Class C ash can be enhanced or converted to an ASTM-certified Class F ash as well. In addition, the data show that a relatively poor performing spec F ash (Fly Ash Source 1) can be greatly enhanced by the remediation or beneficiation process.

FIGS. 11 to 13 demonstrate proof that the remediation or beneficiation process works in terms of remediating or converting a non-spec ash or a spec C ash into a spec F ash. These figures include actual ASTM C618 certifications, as certified by an industry-approved independent laboratory. FIG. 11 shows non-spec ash, Fly Ash Source 3, remediated/beneficiated to a certified spec Class F fly ash. FIG. 12 shows a non-spec ash, Fly Ash Source 2, remediated/beneficiated to a certified spec Class F fly ash. FIG. 13 shows a spec Class C fly ash, Fly Ash Source 4, beneficiated/converted to a certified Class F fly ash.

All publications, patents, and patent applications cited in this specification are incorporated herein by reference in their entirety as if each publication, patent, or patent application was specifically and individually put forth herein.

In this detailed description, reference has been made to multiple embodiments of the disclosure and non-limiting examples relating to how the disclosure can be understood and practiced. Other embodiments that do not provide all of the features and advantages set forth herein may be utilized, without departing from the spirit and scope of the present disclosure. This disclosure incorporates routine experimentation and optimization of the methods and systems described herein. Such modifications and variations are considered to be within the scope of the invention defined by the claims.

Where methods and steps described above indicate certain events occurring in certain order, those of ordinary skill in the art will recognize that the ordering of certain steps may be modified and that such modifications are in accordance with the variations of the disclosure. Additionally, certain of the steps may be performed concurrently in a parallel process when possible, as well as performed sequentially.

Therefore, to the extent that there are variations of the disclosure, which are within the spirit of the disclosure or equivalents of the appended claims, it is the intent that this patent will cover those variations as well. The present disclosure shall only be limited by what is claimed.

What is claimed is:

1. A pozzolanic composition for use in concrete, said composition comprising coal ash combined with a natural pozzolan, wherein said natural pozzolan is present in a concentration of about 1 wt % to about 99 wt %, wherein the combination of said natural pozzolan with said coal ash results in said pozzolanic composition meeting a specification for pozzolanic mixtures, pozzolan admixtures, or supplementary cementitious materials in concrete under ASTM and/or AASHTO.

2. The pozzolanic composition of claim 1, wherein said natural pozzolan is present in a concentration of about 10 wt % to about 90 wt %.

3. The pozzolanic composition of claim 1, wherein a weight ratio of said natural pozzolan to said coal ash is from about 0.01 to about 100 parts natural pozzolan divided by parts coal ash.

4. The pozzolanic composition of claim 3, wherein a weight ratio of said natural pozzolan to said coal ash is from about 0.1 to about 10 parts natural pozzolan divided by parts coal ash.

5. The pozzolanic composition of claim 1, wherein said natural pozzolan is a volcanic ash with pozzolanic properties.

6. The pozzolanic composition of claim 1, wherein said natural pozzolan is a material defined as a natural pozzolan pursuant to ASTM and/or AASHTO.

7. The pozzolanic composition of claim 1, wherein said coal ash is a non-spec ash that does not meet any specifications for pozzolanic mixtures, pozzolan admixtures, or supplementary cementitious materials in concrete under ASTM and/or AASHTO.

8. The pozzolanic composition of claim 7, wherein said coal ash contains less than 50 wt % of the sum of weight percent silicon dioxide, weight percent aluminum oxide, and weight percent iron oxide.

9. The pozzolanic composition of claim 1, wherein said coal ash meets a first specification for pozzolanic mixtures, pozzolan admixtures, or supplementary cementitious materials in concrete under ASTM and/or AASHTO, wherein said combination of said natural pozzolan with said coal ash results in said pozzolanic composition meeting a second specification for pozzolanic mixtures, pozzolan admixtures, or supplementary cementitious materials in concrete under ASTM and/or AASHTO.

10. The pozzolanic composition of claim 9, wherein said coal ash contains at least 50 wt % but less than 70 wt % of the sum of weight percent silicon dioxide, weight percent aluminum oxide, and weight percent iron oxide, wherein said first specification requires at least 50 wt % of the sum of weight percent silicon dioxide, weight percent aluminum oxide, and weight percent iron oxide, and wherein said second specification requires at least 70 wt % of the sum of weight percent silicon dioxide, weight percent aluminum oxide, and weight percent iron oxide.

11. The pozzolanic composition of claim 1, said composition further comprising an additive to adjust water demand of said composition in concrete.

12. The pozzolanic composition of claim 1, wherein said composition is present in a cementitious mixture.

13. A concrete product or structure comprising aggregate and said cementitious mixture of claim 12, or a reaction product thereof.

14. A method of producing a pozzolanic composition for use in concrete, said method comprising:
providing a source of coal ash;
providing a natural pozzolan; and
combining said coal ash with said natural pozzolan, to produce a pozzolanic composition meeting a specification for pozzolanic mixtures, pozzolan admixtures, or supplementary cementitious materials in concrete under ASTM and/or AASHTO, wherein said coal ash is upgraded by the presence of said natural pozzolan to enhance its pozzolanic properties prior to addition of said pozzolanic composition to said concrete.

15. The method of claim 14, wherein said natural pozzolan is present in a concentration of about 1 wt % to about 99 wt % in said pozzolanic composition.

16. The method of claim 15, wherein said natural pozzolan is present in a concentration of about 10 wt % to about 90 wt % in said pozzolanic composition.

17. The method of claim 14, wherein said natural pozzolan is a material defined as a natural pozzolan pursuant to ASTM and/or AASHTO.

18. The method of claim 14, wherein said coal ash is a non-spec ash that does not meet any specifications for pozzolanic mixtures, pozzolan admixtures, or supplementary cementitious materials in concrete under ASTM and/or AASHTO.

19. The method of claim 14, wherein said coal ash meets a first specification for pozzolanic mixtures, pozzolan admixtures, or supplementary cementitious materials in concrete under ASTM and/or AASHTO, wherein said combination of said natural pozzolan with said coal ash results in said pozzolanic composition meeting a second specification for pozzolanic mixtures, pozzolan admixtures, or supplementary cementitious materials in concrete under ASTM and/or AASHTO.

20. The method of claim 19, wherein said coal ash contains at least 50 wt % but less than 70 wt % of the sum of weight percent silicon dioxide, weight percent aluminum oxide, and weight percent iron oxide, wherein said first specification requires at least 50 wt % of the sum of weight percent silicon dioxide, weight percent aluminum oxide, and weight percent iron oxide, and wherein said second specification requires at least 70 wt % of the sum of weight percent silicon dioxide, weight percent aluminum oxide, and weight percent iron oxide.

* * * * *